US012240140B2

(12) United States Patent
Anderson et al.

(10) Patent No.: US 12,240,140 B2
(45) Date of Patent: Mar. 4, 2025

(54) ADJUSTABLE HOLD-DOWN SHOE ASSEMBLY, PLANER MILL TRIMMER HAVING THE ASSEMBLY MOUNTED THEREON, AND METHOD OF USING THE ASSEMBLY TO HOLD DOWN LUMBER DURING END CUTTING BY A PLANER MILL TRIMMER

(71) Applicant: Timber Automation, LLC, Hot Springs, AR (US)

(72) Inventors: James L. Anderson, Florence, SC (US); Russell R. Kennedy, Hot Springs, AR (US); Douglas Monroe Tinsley, Hot Springs, AR (US); Thomas Wayne Green, Hot Springs, AR (US)

(73) Assignee: Timber Automation, LLC, Hot Springs, AR (US)

( * ) Notice: Subject to any disclaimer, the term of this patent is extended or adjusted under 35 U.S.C. 154(b) by 146 days.

(21) Appl. No.: 17/739,406

(22) Filed: May 9, 2022

(65) Prior Publication Data

US 2022/0388195 A1 Dec. 8, 2022

Related U.S. Application Data

(60) Provisional application No. 63/197,543, filed on Jun. 7, 2021.

(51) Int. Cl.
*B27B 25/06* (2006.01)
*B27B 5/04* (2006.01)

(52) U.S. Cl.
CPC ................ *B27B 25/06* (2013.01); *B27B 5/04* (2013.01)

(58) Field of Classification Search
CPC .. B27B 5/00; B27B 5/04; B27B 5/228; B27B 25/06; B27C 5/06; B27G 19/02; B27G 19/028
USPC ........................................ 144/250.12; 83/422
See application file for complete search history.

(56) References Cited

U.S. PATENT DOCUMENTS 3,101,104 A * 8/1963 Sullivan ................. B27G 19/02 144/250.18
5,680,888 A * 10/1997 St-Pierre ................. B27B 5/228 144/250.12

FOREIGN PATENT DOCUMENTS

CA 2241806 A1 * 1/2000 ............. B27B 25/06
CA 2277249 A1 * 1/2000 ............. B27B 25/00

OTHER PUBLICATIONS

Canadian Patent Office—Examination Report mailed Apr. 15, 2024, from CA Patent Application No. 3,160,984, 3 pages.

* cited by examiner

*Primary Examiner* — Jared O Brown
(74) *Attorney, Agent, or Firm* — SCHWABE, WILLIAMSON & WYATT, P.C.

(57) ABSTRACT

An adjustable hold-down shoe assembly having an assembly body, a plurality of hold-down shoes movably mounted to the assembly body, a bias device that biases the plurality of hold-down shoes in a direction away from the lumber bias surface, a body mount, and a lifting/lowering mechanism movably connecting the assembly body to the body mount that moves the assembly body in relation to the body mount and in a first direction towards the lumber bias surface and in a second direction away from the lumber bias surface. A planermill trimmer having the adjustable hold-down shoe assembly mounted thereon and a method of end trimming lumber using the planermill trimmer.

16 Claims, 7 Drawing Sheets

ADJUSTABLE HOLD-DOWN SHOE ASSEMBLY, PLANER MILL TRIMMER HAVING THE ASSEMBLY MOUNTED THEREON, AND METHOD OF USING THE ASSEMBLY TO HOLD DOWN LUMBER DURING END CUTTING BY A PLANER MILL TRIMMER

FIELD OF THE INVENTION

The invention relates to a hold-down shoe assembly that is adjustable to adjust all of the hold-down shoes up and down as a unit, a planermill trimmer having the assembly mounted thereon, and a method of using the hold-down shoe assembly to hold down lumber during end cutting by a planer mill trimmer.

BACKGROUND OF THE INVENTION

In a sawmilling operation, multi-saw trimmers with saws on nominal 2 foot centers are used to trim both the near end (NE) and far end (FE) of each piece of lumber. The boards are conveyed laterally through the trimmer on lugs at a high rate of speed and each saw raises (and lowers) at the appropriate time to trim the end of the piece according to a manual input, optimized solution (green systems) or grader solution (planermill systems).

Each saw must have a "hold-down" of some sort beside it to 1) hold down the board while sawing, 2) cause the cut-off end to drop out to the waste conveyor below, 3) allow the board to exit the trimmer straight without skewing crossways and 4) keep the board from kicking out of the infeed (or outfeed) of the trimmer, causing damage to equipment or physical injury to surrounding personnel.

In a green system, the boards can be varying thicknesses from 1 inch (or less) up to 6 inch (or more). In this case, the hold-down shoe must be designed to allow each piece to enter under the shoe and into the hold-down (sawing) area. This is not optimal (for speed), but is designed to be the best it can be considering the thickness that must be run through the trimmer. One disadvantage is that the angle of the shoe is different (and not flat at the sawing area) based on the thickness of lumber being sawn.

In a dry (or planermill) system, only one thickness piece is run through the trimmer at a time. This thickness (based on nominal size entering planermill and planer thickness setting) is usually run for several days at a time. This allows for a hold-down shoe that can be optimally set for the incoming lumber thickness. Planermill lumber board piece counts are much higher than sawmill (green) lumber board piece counts. FIG. 1 [Prior Art] illustrates an example of a conventional planermill trimmer in which each hold-down shoe is independently connected to the planermill trimmer and independently adjusted. Even though the conventionally mounted hold-down shoes allow for all thickness of lumber, they are far too aggressive for 6 inch thick lumber and thicker, hammering off the back-end of the lumber and do not allow high speeds to meet customer requirements on the 1 and 2 inch thick lumber. Thick, square, timbers entering the trimmer have often been known to roll back over the lug that is conveying it through the trimmer.

In years past, some planermill trimmers have been made with adjustable mechanisms with straps attached to the rear of the shoe, as shown in FIG. 2 [Prior Art]. When the mechanism was adjusted (with a hydraulic cylinder or manual jack) the shoe would be set so that it moved very little (up and down) when the piece entered the trimmer, thus allowing for higher speeds. However, this type of system is complicated and hard to mount on many trimmer frames.

SUMMARY OF THE INVENTION

The present invention solves the problems of thick lumber slamming off of the conventional hold-down shoes. The present invention also provides a far simpler and efficient method of adjusting all of the hold-down shoes simultaneously, and without changing the angle of the hold-down shoes for each thickness of lumber being trimmed.

The objectives of the invention and other objectives can be obtained by an adjustable hold-down shoe assembly comprising:

- an assembly body;
- a plurality of hold-down shoes movably mounted to the assembly body, each hold-down shoe is elongated and has an angled lumber surface configured to slide against lumber, and each hold-down shoe has a lumber bias surface configured to slide against the lumber and bias the lumber in a direction away from the lumber bias surface;
- a bias device configured to bias the plurality of hold-down shoes in a direction away from the lumber bias surface;
- a body mount; and
- a lifting/lowering mechanism movably connecting the assembly body to the body mount and is configured to move the assembly body in relation to the body mount and in a first direction towards the lumber bias surface and in a second direction away from the lumber bias surface.

The objectives of the invention and other objectives can also be obtained by a planermill trimmer comprising:

- a conveyor configured to convey lumber in a first direction;
- the planermill trimmer disposed above the conveyor and configured to end cut the lumber on the conveyor;
- an adjustable hold-down shoe assembly comprising:
  - an assembly body;
  - a plurality of elongated hold-down shoes movably mounted to the assembly body, each hold-down shoe having an angled lumber surface configured to slide against the lumber, and each hold-down shoe having a lumber bias surface configured to slide against the lumber and bias the lumber in a direction away from the lumber bias surface and towards the conveyor;
  - a bias device configured to bias the plurality of elongated hold-down shoes in a direction away from the lumber bias surface and towards the conveyor;
  - a body mount connected to the planermill trimmer; and
  - a lifting/lowering mechanism movably connecting the assembly body to the body mount and is configured to move the assembly body in relation to the body mount and in a first direction away from the conveyor and in a second direction towards the conveyor.

The objectives of the invention can be further obtained by a method of cutting lumber in a planer mill comprising:

- providing a planer mill comprising;
  - a conveyor configured to convey lumber in a first direction;
  - the planermill trimmer disposed above the conveyor and configured to end cut the lumber on the conveyor;
  - an adjustable hold-down shoe assembly comprising:
    - an assembly body;

a plurality of elongated hold-down shoes movably mounted to the assembly body, each hold-down shoe having an angled lumber surface configured to slide against the lumber, and each hold-down shoe having a lumber bias surface configured to slide against the lumber and bias the lumber in a direction away from the lumber bias surface and towards the conveyor;

a bias device configured to bias the plurality of elongated hold-down shoes in a direction away from the lumber bias surface and towards the conveyor;

a body mount connected to the planermill trimmer; and a lifting/lowering mechanism movably connecting the assembly body to the body mount and is configured to move the assembly body in relation to the body mount and in a first direction away from the conveyor and in a second direction towards the conveyor;

conveying a piece of lumber on the conveyor;

the lumber sliding against the angled lumber surface and raising the hold-down shoes in a direction away from the conveyor; and the lumber being biased against the conveyor by the lumber bias surface while the lumber is edge cut by the planermill trimmer.

DETAILED DESCRIPTION OF THE INVENTION

The invention will now be explained with reference to the attached non-limiting drawings. To facilitate an understanding of the principles and features of the various embodiments of the present invention, various illustrative embodiments are explained below. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms “a,” “an” and “the” include plural references unless the context clearly dictates otherwise. For example, reference to a component is intended also to include composition of a plurality of components. References to a composition containing “a” constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

Figure 1:
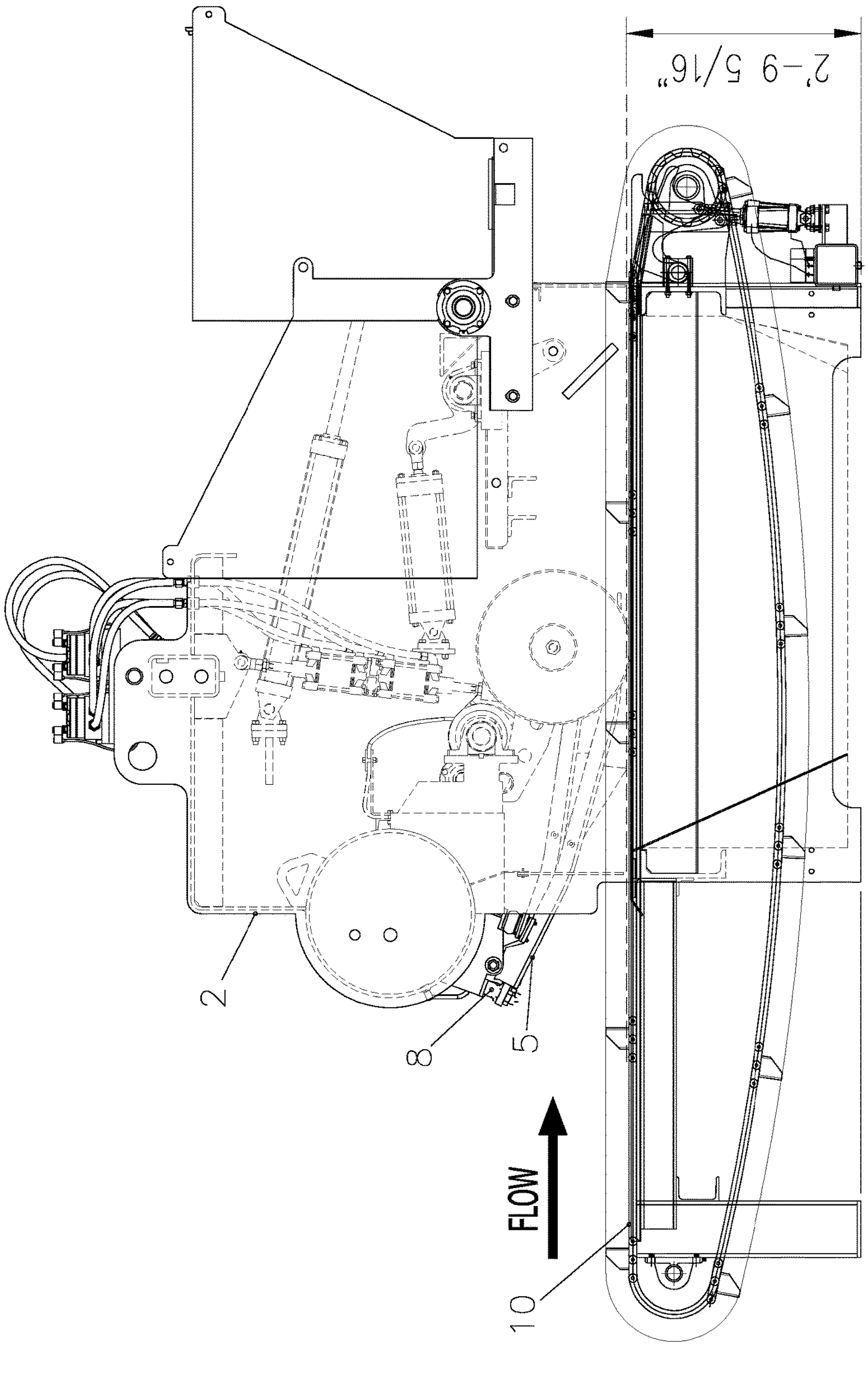
FIG. 1 [PRIOR ART]
FIG. 1 [Prior Art] illustrates a conventional planermill trimmer having individual hold-down shoes mounted thereon.
Figure 2:
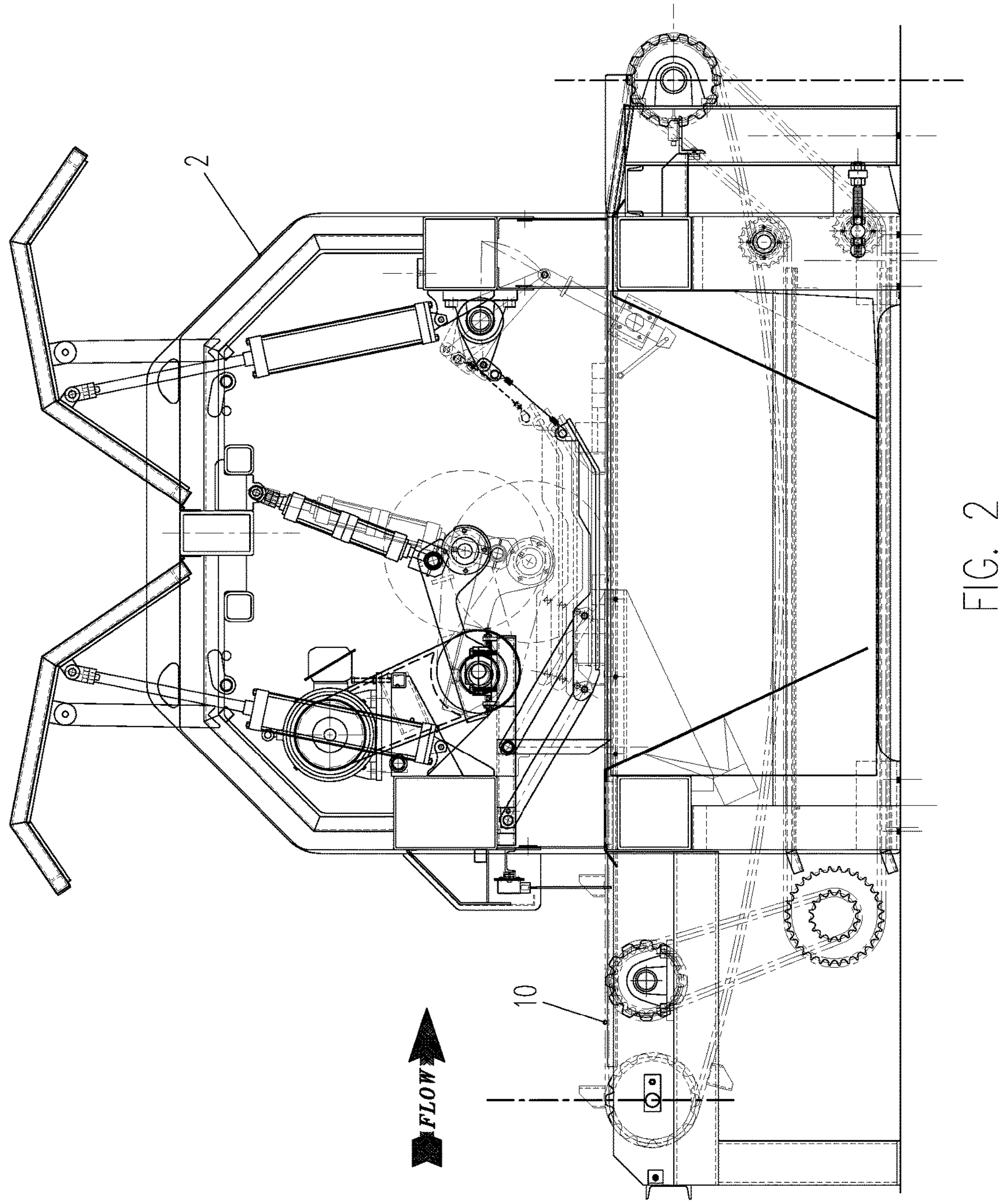
FIG. 2 [PRIOR ART]
FIG. 2 [Prior Art] illustrates a conventional planermill trimmer having an adjustable mechanism having straps attached to rear of each shoe.
Figure 3:
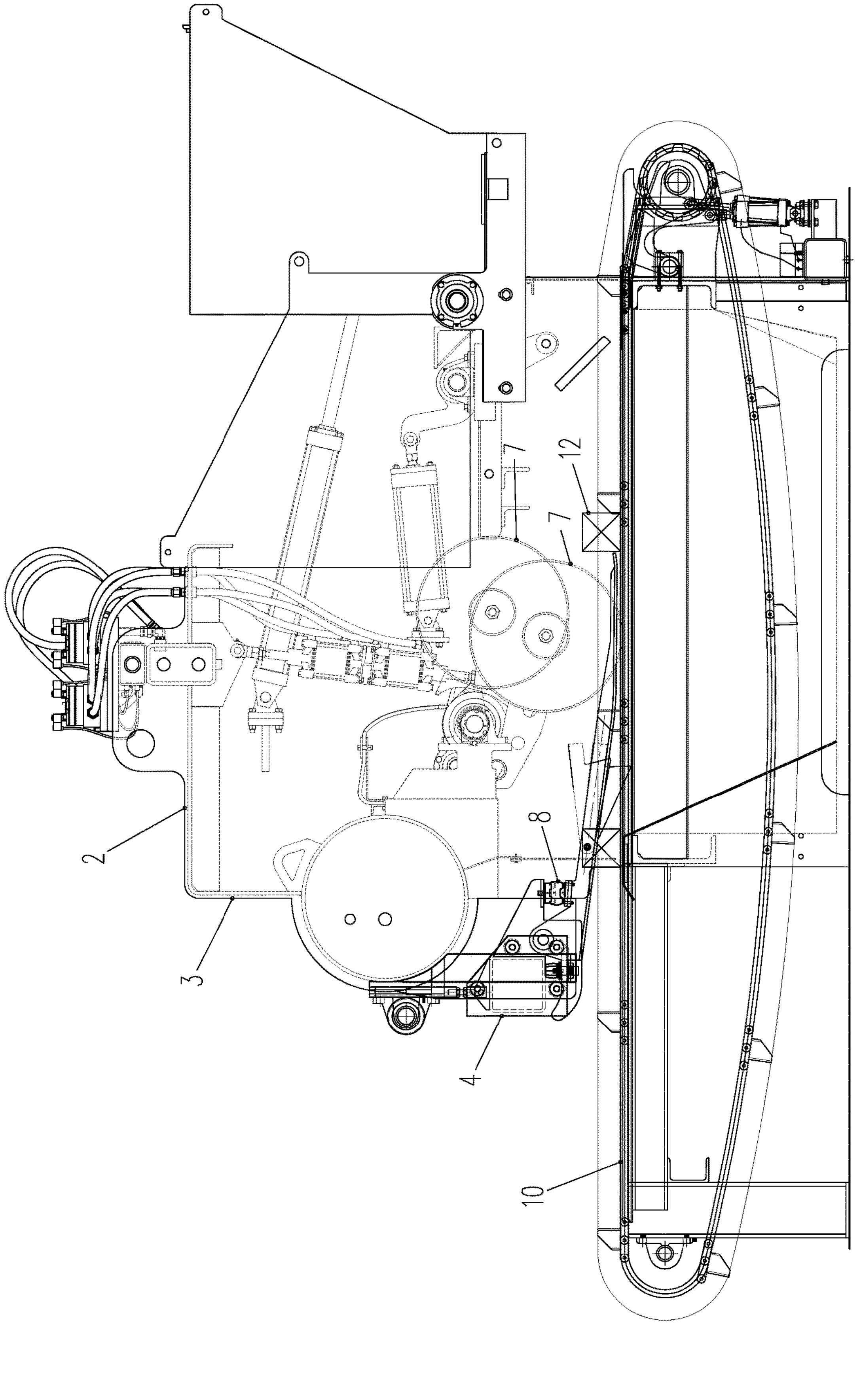
FIG. 3 illustrates a planermill trimmer having mounted thereon an improved hold-down shoe assembly according to the present invention.
Figure 4:
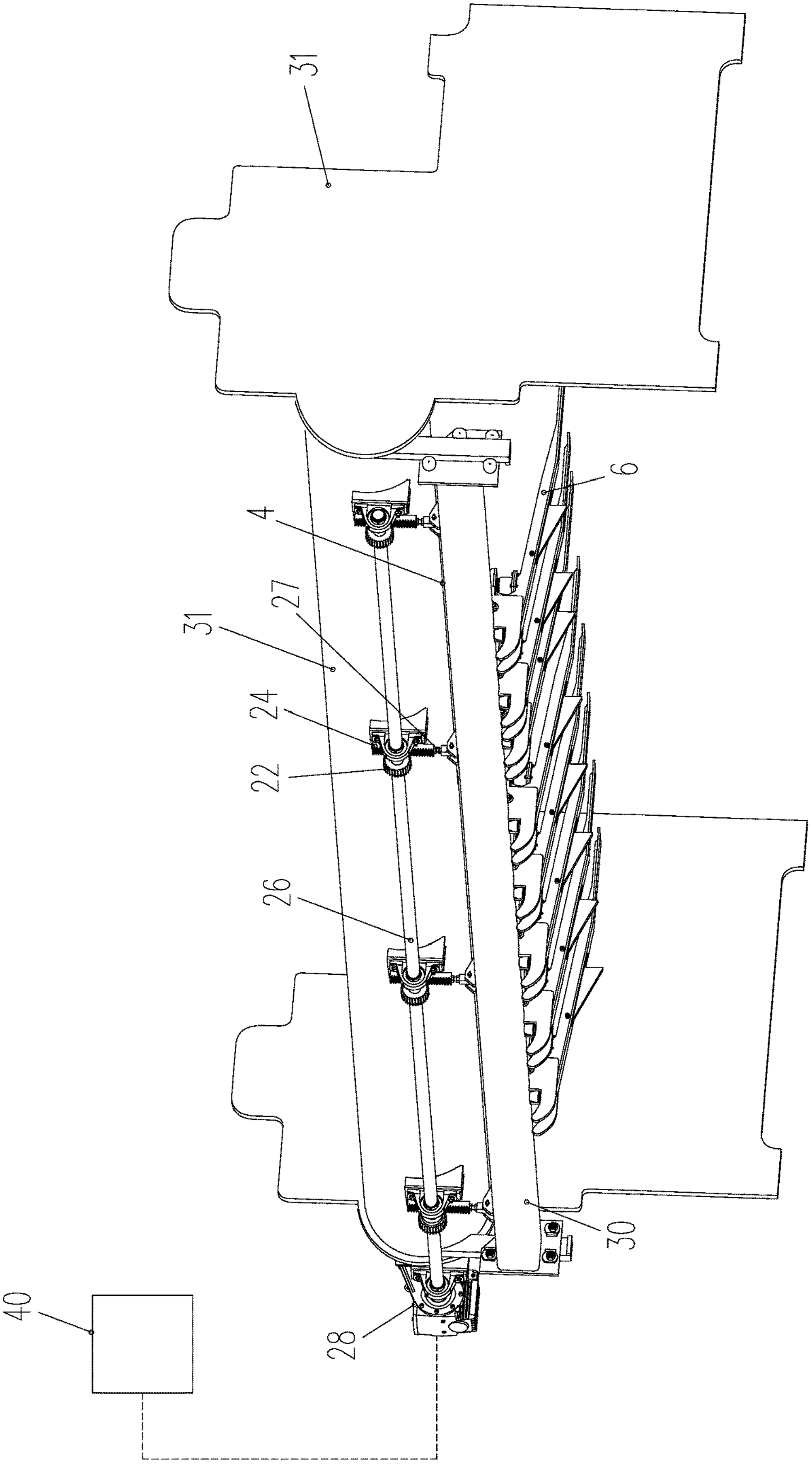
FIG. 4 illustrates an angled view of a hold-down shoe assembly according to the present invention.
Figure 5:
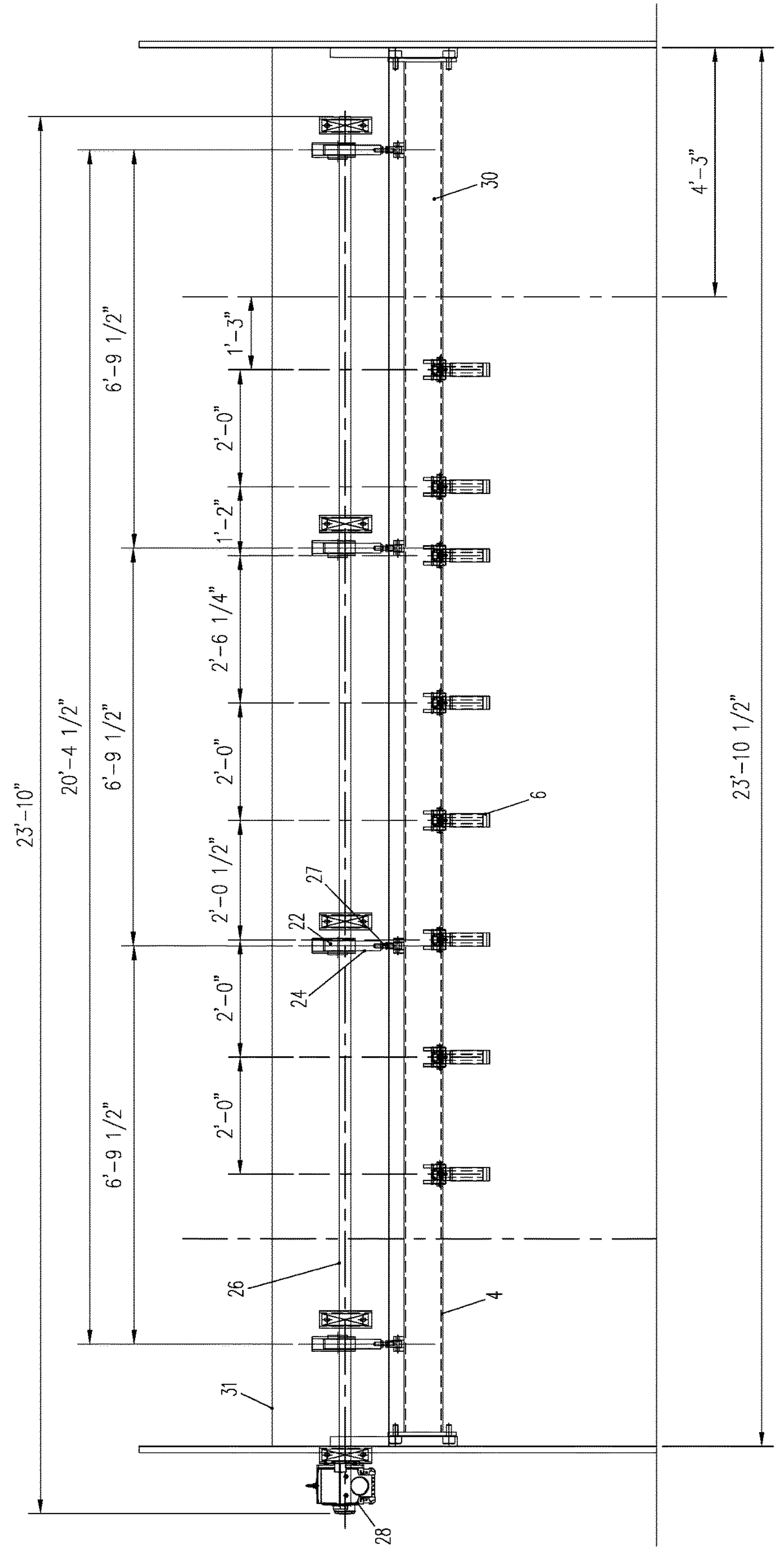
FIG. 5 illustrates a front view of a hold-down shoe assembly according to the present invention.
Figure 6:
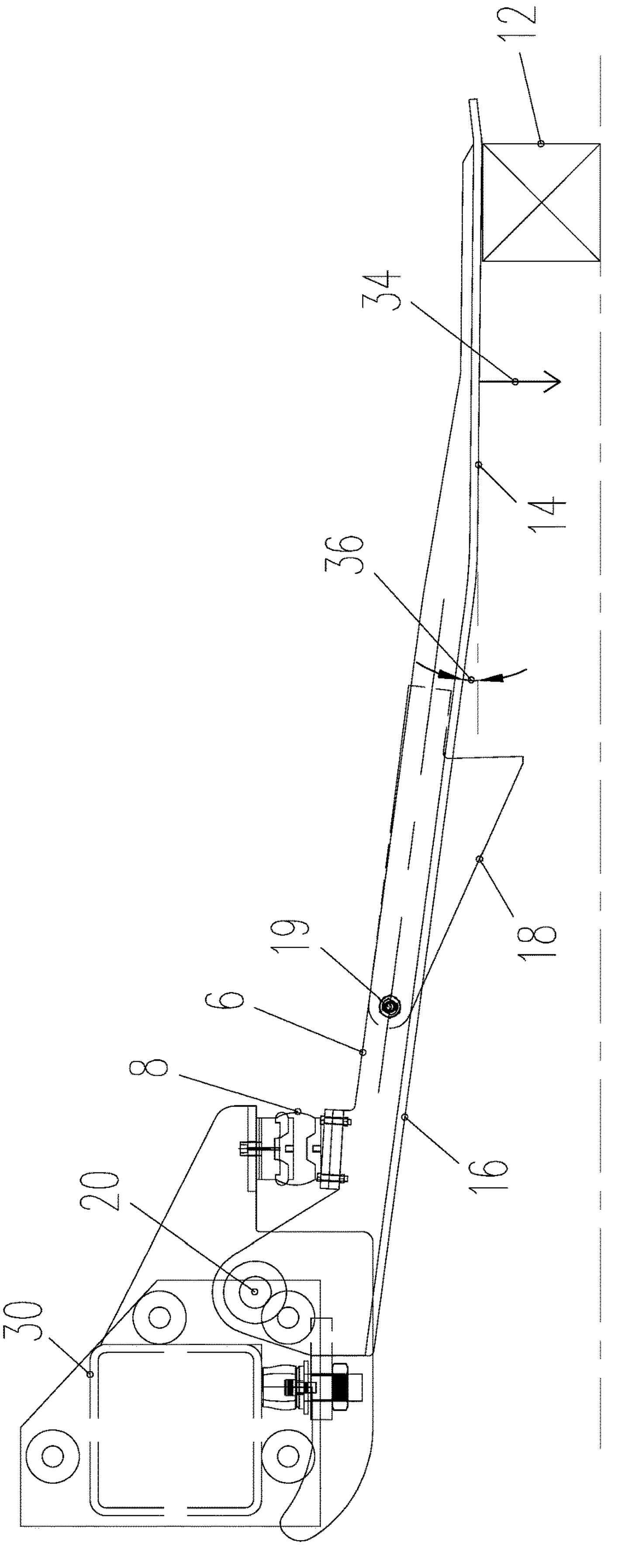
FIG. 6 illustrates a side view of a hold-down shoe assembly according to the present invention.

FIG. 1 [Prior Art] illustrates a conventional planermill trimmer 2 having individually mounted conventional hold-down shoes 5. Even though the conventionally mounted hold-down shoes 5 allow for all thicknesses of lumber, they are still far too aggressive for 6 inch thick lumber 12 and thicker, hammering off the back-end of the lumber 12 and do not allow high speeds to meet customer requirements on the 1 and 2 inch thick lumber 12.

FIGS. 3-6 illustrate a planermill trimmer 2 having an improved hold-down shoe assembly 4 mounted thereon. The hold-down shoes 6 in the present invention can have the same shape and design as the conventional hold-down shoes 5, with the exception of being able to provide a flatter sliding surface angle 36 than the conventional hold-down shoes 5. Examples of a suitable angle 36 is 1 to 25°, preferably from 1 to 20°, more preferably from 1 to 15°, even more preferably from 1 to 10°.

In an example of the present invention produced, the hold-down shoes 6 were mounted on the assembly body 30 with about 2 feet between centers of the hold-down shoes 6. Any desired distance between the hold-down shoes 6 can be utilized. The assembly body 30 comprised a tube that spanned across the front of the planer trimmer 2 and allowed the lumber 12 to pass beneath the assembly body 30. Each of the hold-down shoes 6 has an associated airbag 8. The air-bag 8 can be adjusted to add additional hold-down pressure (bias) on the lumber 12 being end trimmed. Air-bags 8 are now well known and any suitable air-bag 8 and associated equipment to operate and control the air-bag 8 can be utilized.

Since the entire assembly body 30 with all of the hold-down shoes 6 can be adjusted up and down in relation to the conveyor 10, the angle 36 for each different size of lumber can remain the same and the hold-down shoes 6 do not hammer off the back of the lumber 12 when the angled lumber surface 16 contacts the lumber 12. Furthermore, each piece of lumber 12 can now come gently into the angled lumber surface 16 without fear of rolling larger lumber 12, such as square 4 inch×4 inch or 6 inch×6 inch lumber 12.

FIGS. 4-7 illustrate a lifting/lower device movably connecting the assembly body 30 to the body mount 31. The lifting/lowering device is configured to move the assembly body 30 in relation to the body mount 31 and in a first direction away from the lumber bias surface 14 and towards the conveyor 10, and in a second direction toward the lumber bias surface 14. The lifting/lowering device comprises a lifting/lowering gear 22 having gear teeth 23 that is mounted on a gear drive shaft 26 driven by a lifting/lowering motor 28, a lifting/lowering toothed plate 24 having plate teeth 25, and the plate teeth 25 engaging the gear teeth 23. The lifting/lowering gear 22 and the gear drive shaft 26 are on the body mount 31 and the lifting/lowering toothed plate 24 is connected to the assembly body 30. In the example shown in the FIGS., the assembly body 30 is held so that its movement is limited to straight up and down only by the use of four sets of lifting/lowering gears 22 and associated lifting/lowering toothed plates 24. Rotating the gear drive shaft 26 rotates the lifting/lowing gears 22 which moves the lifting/lowering toothed plates 24 in relation to the lifting/lowering gears 22.

Figure 7:
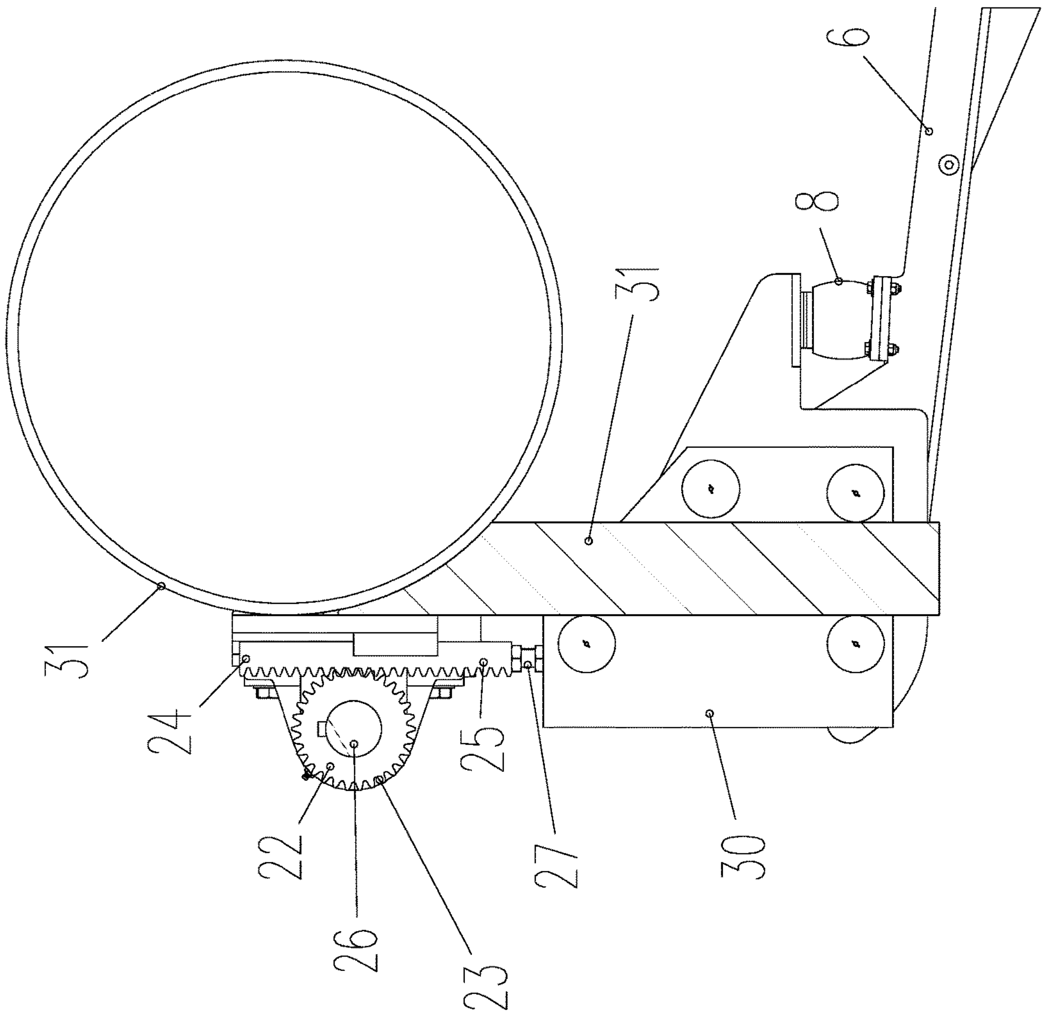
FIG. 7 illustrates a side view of the lifting/lowering gear engaging the lifting/lowering toothed plate.

In order to add strength in a y-axis (vertical) for the full-spanning tube (assembly body 30) with the hold-down shoes 6 attached, several racks (gear 22 and plate 24) can be attached across the span of the assembly body 30. FIG. 7 shows one of these racks up-close. The gear drive shaft 26 not only lifts the hold-down shoes 6 and assembly body 30 when rotated, but acts as an equalizer or stabilizer so that each end of the assembly body 30 is lifted equally, keeping the hold-down shoe assembly 4 parallel with the flow of the lumber 12 on the conveyor 10, i.e. not tilted. The lifting/lowing toothed plate 24 can be mounted to the assembly body 30 using an adjustable tie rod 27 to make adjustments for any manufacturing discrepancies or assembly body 30 deflection. Lifting and lowering of the assembly body 30 lifts and lowers all of the hold-down shoes 6 at the same time to adjust for the thickness of the lumber 12. The sliding surface angle 36 is preferably not changed during the lifting and lowering of the assembly 4.

The lifting/lowering motor 28 can be a servo motor (with encoder feedback) for setworks placement. If desired, the lifting/lowering motor 28 can be replaced with a hand-crank for manual adjustment. Another example of the lifting/lowering device includes an electric or hydraulic cylinder, with or without electronic feedback. In the present example, the lifting/lowering motor 28 was an electric motor with absolute encoder (for position feedback) and electric brake for holding position during operation. In this manner, the settings can be the same for a number of shifts or days. A self-locking reducer can be utilized. However, a brake is preferably used to ensure that the assembly body 30 does not move during operation of the planermill trimmer 2. The settings of the servo motor hold-down shoes can be done by a computer system 40 based on the product thickness being manufactured.

In the current design, the mechanism will mount directly to the front of the Timber Automation trimmer, but it is envisioned that future designs for trimmers manufactured by other OEMS, the mechanism could be made free-standing as well.

REFERENCE NUMBERS

2 Planermill trimmer
3 Trimmer
4 Hold-down shoe assembly
5 Prior art hold-down shoe
6 Hold-down shoe
7 End trimming saw
8 Air bag
10 Conveyor
12 Lumber
14 Lumber bias surface
16 Angled lumber surface
18 Anti-kick-back stop
19 Stop movable mount
20 Shoe movable mount
22 Lifting/lowering gear
23 Gear teeth
24 Lifting/lowering toothed plate
25 Plate teeth
26 Gear drive shaft
27 Adjustable tie rod
28 Lifting/lowering motor
30 Assembly body
31 Body mount
34 Bias towards conveyor
36 Sliding surface angle
40 Computer system It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. An adjustable hold-down shoe assembly comprising:
an assembly body;
a plurality of hold-down shoes movably mounted to the assembly body, each hold-down shoe is elongated and has an angled lumber surface configured to slide against lumber, and each hold-down shoe has a lumber bias surface configured to slide against the lumber and bias the lumber in a direction away from the lumber bias surface;
a bias device configured to bias the plurality of hold-down shoes in a direction away from the lumber bias surface;
a body mount; and
a lifting/lowering mechanism movably connecting the assembly body to the body mount and is configured to move the assembly body in relation to the body mount and in a first direction towards the lumber bias surface and in a second direction away from the lumber bias surface.

2. The adjustable hold-down shoe assembly according to claim 1, wherein the lifting/lowering mechanism comprises a lifting/lowering gear having gear teeth that is mounted on a gear drive shaft driven by a lifting/lowering motor, and a lifting/lowering toothed plate having plate teeth, and the plate teeth engaging the gear teeth.

3. The adjustable hold-down shoe assembly according to claim 2, wherein the lifting/lowering gear and the gear drive shaft are on the body mount and the lifting/lowering toothed plate is connected to the assembly body.

4. The adjustable hold-down shoe assembly according to claim 1, wherein the bias device comprises an air bag connected to the body mount, an air pressure in the air bag determines an amount of the bias, and each hold-down shoe has an associated air bag.

5. The adjustable hold-down shoe assembly according to claim 1, wherein the hold-down shoes are pivotably mounted to the assembly body.

6. The adjustable hold-down shoe assembly according to claim 1, further comprising an anti-kick-back stop configured to allow movement of the lumber in a first direction from the angled lumber surface to the lumber bias surface and not allow movement of the lumber in a second direction from the lumber bias surface to the angled lumber surface.

7. The adjustable hold-down shoe assembly according to claim 6, wherein the anti-kick-back stop is movable in the first direction and the second direction.

8. The adjustable hold-down shoe assembly according to claim 1, wherein an angle between the angled lumber surface and the lumber bias surface is between 1-25°.

9. A planermill trimmer comprising:

a conveyor configured to convey lumber in a first direction;

a trimmer, wherein the trimmer includes a frame and a saw mounted to the frame and disposed above the conveyor, and the saw is configured to end cut the lumber on the conveyor;

an adjustable hold-down shoe assembly comprising:

an assembly body;

a plurality of elongated hold-down shoes movably mounted to the assembly body, each hold-down shoe having an angled lumber surface configured to slide against the lumber, and each hold-down shoe having a lumber bias surface configured to slide against the lumber and bias the lumber in a direction away from the lumber bias surface and towards the conveyor;

a bias device configured to bias the plurality of elongated hold-down shoes in a direction away from the lumber bias surface and towards the conveyor;

a body mount connected to the trimmer; and a lifting/lowering mechanism movably connecting the assembly body to the body mount and is configured to move the assembly body in relation to the body mount and in a first direction away from the conveyor and in a second direction towards the conveyor.

10. The planermill trimmer according to claim 9, wherein the lifting/lowering mechanism comprises a lifting/lowering gear having gear teeth that is mounted on a gear drive shaft driven by a lifting/lowering motor, and a lifting/lowering toothed plate having plate teeth, and the plate teeth engaging the gear teeth.

11. The planermill trimmer according to claim 10, wherein the lifting/lowering gear and the gear drive shaft are on the body mount and the lifting/lowering toothed plate is connected to the assembly body.

12. The planermill trimmer according to claim 9, wherein the bias device comprises an air bag connected to the body mount, an air pressure in the air bag determines an amount of the bias, and each hold-down shoe has an associated air bag.

13. The planermill trimmer according to claim 9, wherein the hold-down shoes are pivotably mounted to the assembly body.

14. The planermill trimmer according to claim 9, further comprising an anti-kick-back stop configured to allow movement of the lumber in a first direction from the angled lumber surface to the lumber bias surface and not allow movement of the lumber in a second direction from the lumber bias surface to the angled lumber surface.

15. The planermill trimmer according to claim 14, wherein the anti-kick-back stop is movable in the first direction and the second direction.

16. The planermill trimmer according to claim 9, wherein an angle between the angled lumber surface and the lumber bias surface is between 1-25°.

* * * * *